July 14, 1970 M. CARBONEL 3,520,782

METHOD OF WIRING INTEGRATED MAGNETIC CIRCUITS

Filed Dec. 28, 1966

United States Patent Office 3,520,782

Patented July 14, 1970

3,520,782
METHOD OF WIRING INTEGRATED MAGNETIC CIRCUITS

Michel Carbonel, Paris, France, assignor to CSF-Compagnie Generale de Telegraphie Sans Fil, a corporation of France Filed Dec. 28, 1966, Ser. No. 605,329
Claims priority, application France, Dec. 30, 1965, 44,366
Int. Cl. C23b 7/00, 5/48
U.S. Cl. 204—16 2 Claims

ABSTRACT OF THE DISCLOSURE

The invention has for an object a method of wiring conductors on magnetic circuits; a foil of metal is deposited on a plate of insulating material; projections and separated lower conductors are formed in said foil by photoengraving. The magnetic circuit is made by cutting a magnetic plate; the plate coated with successive layers of elastic material. The magnetic circuit is then positioned on said lower conductors. The upper conductors are positioned on said magnetic circuit and on the projections, and then soldered to the projections.

The present invention relates to the manufacture of wired magnetic circuits, consisting in depositing the conductors all at once on a large number of magnetic circuits.

Magnetic elements, such, for example, as toroidal cores or transfluxors, enable the building up of memories and logic circuits which are reliable but costly. The wiring of the windings on such magnetic circuits is difficult and must often be made by hand.

Various methods enable these drawbacks to be overcome, for example, by depositing the conductors under a vacuum, all at once, on a large number of magnetic circuits, formed, for example, from thin laminated magnetic material (for example, 10 microns thick).

However, with methods using a vacuum, it is very difficult to obtain thick conductors which are sometimes necessary in certain applications of magnetic logics.

It is an object of the invention to provide a method free of this drawback.

According to the invention, there is provided a method of wiring conductors on magnetic circuits comprising the following steps: depositing on a plate of insulating material a foil of metal; forming projections in said foil by a first photoengraving; forming in said foil separated lower conductors by a second photoengraving; cutting in a magnetic plate a predetermined magnetic circuit; coating said circuit with successive layers of elastic material and glue; depositing said magnetic circuits on said lower conductors in respective lateral contact with said projections; depositing upper conductors on said magnetic circuit and said projections; and soldering said conductors to said projections.

For a better understanding of the invention and to show how the same may be carried into effect, reference will be made to the drawing accompanying the following description, in which.

In all the figures, the same reference numbers designate the same elements.

The method according to the invention comprises the following steps:

(a) The preparation of the magnetic circuits, which is shown in FIGS. 1, 2, 3 and 4.

Figure 5:
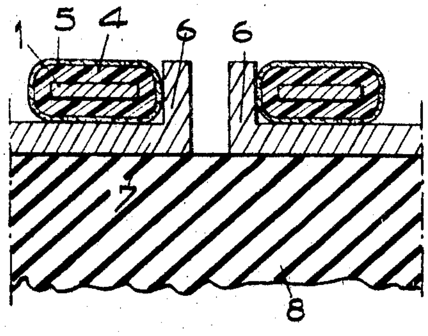
FIG. 5 shows the lower conductor elements of a winding associated with the magnetic circuit.
Figure 6:
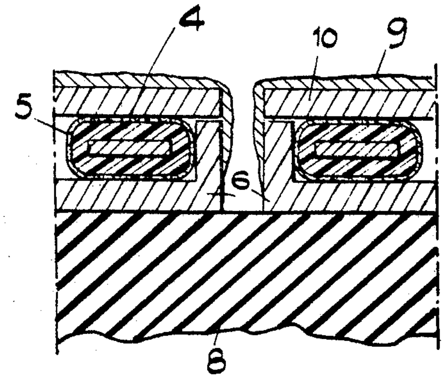
FIG. 6 shows the upper conductor elements and the lower conductor elements surrounding a magnetic circuit.

(b) The placing into position of the lower and upper conductors building up the winding surrounding the magnetic circuits, as shown in FIGS. 5 and 6.

(c) The forming of the contacts between the lower and upper conductors by an electrolytic process, which is also shown in FIG. 6.

Figure 1:
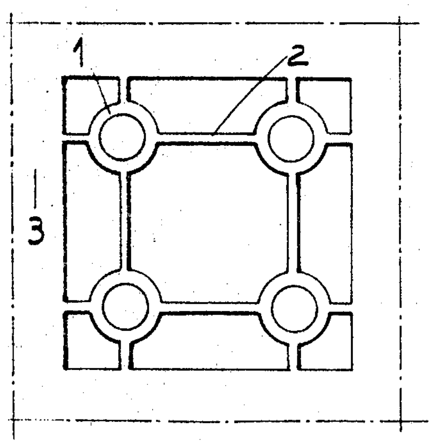
FIG. 1 is a plan view of an assembly of closed magnetic circuits cut in a foil of magnetic material.

FIG. 1 shows an assembly of magnetic circuits 1, which is formed by means of a known photoengraving method in a thin plate of magnetic metal 3, for example, 20 microns thick. The circuits 1 are interconnected by legs 2. These legs serve only as mechanical supports and their transverse dimensions are sufficiently small to avoid any interference with the operation of the magnetic circuit.

Figure 2:
FIG. 2 is a cross-section of the magnetic circuit of FIG. 1.

FIG. 2 shows a cross-section of a magnetic circuit 1 in the form of a torus.

Figure 3:
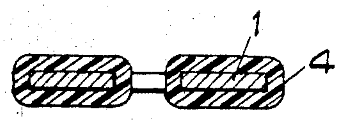
FIG. 3 is the same cross-section insulated by means of a coating.

FIG. 3 shows the magnetic circuit of FIG. 2 after a coating 4 forming a shell of elastic material, for example of silastene, has been applied thereto. The coating serves both as an electric insulator and as a protection gainst mechanical stresses. This coating is deposited by spraying.

Figure 4:
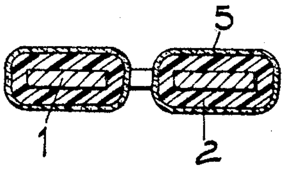
FIG. 4 is a cross-section of a magnetic circuit whose coating is covered by a layer of adhesive.

FIG. 4 shows the element of FIG. 3, after the application of a layer of glue, which is deposited on the elastic shell 4 by vaporization.

FIG. 5 shows a printed circuit plate, comprising a laminate 8 on which has been deposited a foil of conducting metal, in which are formed by photoengraving conductor elements 7, the thickness of which may exceed 100 microns, and projecting pieces 6.

Two operations are necessary for forming conductors 7 and projections 6. A first photoengraving at about mid-thickness forms the projections 6 and a second photoengraving provides the lower conductors 7.

FIG. 6 shows the placing into position of the upper conductors 10, which are cut separately in a plate of copper and connected between them by legs which are cut during the final photogravure.

The three above-mentioned components are then assembled: the upper conductors 10, interconnected between them by legs, the plate 3, supporting the magnetic circuits 1, and the laminated plate 8, carrying the lower conductors 7 and the projecting members 6. Since the conductors have not been obtained under a vacuum, they may have a substantial thickness (exceeding 100 microns) and this makes it possible to prevent any risk of fracture. After these three components have been suitably positioned, a provisional gluing is effected by means of the glue 5 deposited on each magnetic circuit. This is achieved by the simultaneous application of pressure and heat. The three components having been formed separately prior to their assembly, the production rate is considerably enhanced.

The upper conductors 10 and the lower conductors 7 are then connetced by means of a copper deposit 9, obtained by electrolysis (this electrolytic welding has the advantage that it is very easy to control).

The presence of the projecting members reduces the length of the weld to be made, and thus the duration of the electrolysis. Moreover, the presence of the projecting members 6 prevents an electrolysis from taking place in a hole, where the electrolyte is renewed with greater difficulty.

By means of a last photogravure, the undesirable conductors are removed which served only for the mechanical support of the elements prior to the assembly or as lead-ins for the current. Also, in order to facilitate the final gravure, the conductors intended to be cut, that is to say, the conductors serving to bring in the electrolytic current or to provide the mechanical strength, may be rendered thinner. This reduction is produced by partial photogravure of the upper and lower conductors.

What is claimed is:

1. A method of wiring conductors on magnetic circuits comprising the following steps: depositing on a plate of insulating material a foil of metal; forming projections in said foil by a first photoengraving; forming in said foil separated lower conductors by a second photoengraving; cutting, in a magnetic plate, a predetermined magnetic circuit; coating said circuit with successive layers of elastic material and glue; positioning said magnetic circuit on said lower conductors in respective lateral contact with said projections; positioning upper conductors on said magnetic circuit and said projections; and electrodepositing a material to unite said upper conductors to said projections.

2. A method as claimed in claim 1, comprising a further photoengraving step for removing parts of said upper conductors.

References Cited

UNITED STATES PATENTS

| | | | |
|---|---|---|---|
| 3,130,134 | 4/1964 | Jones | 204—15 |
| 3,317,408 | 5/1967 | Barnes et al. | 204—15 |
| 3,377,699 | 4/1968 | Dinella et al. | 204—15 |

HOWARD S. WILLIAMS, Primary Examiner

T. TUFARIELLO, Assistant Examiner

U.S. Cl. X.R.

204—15